Figure 1:
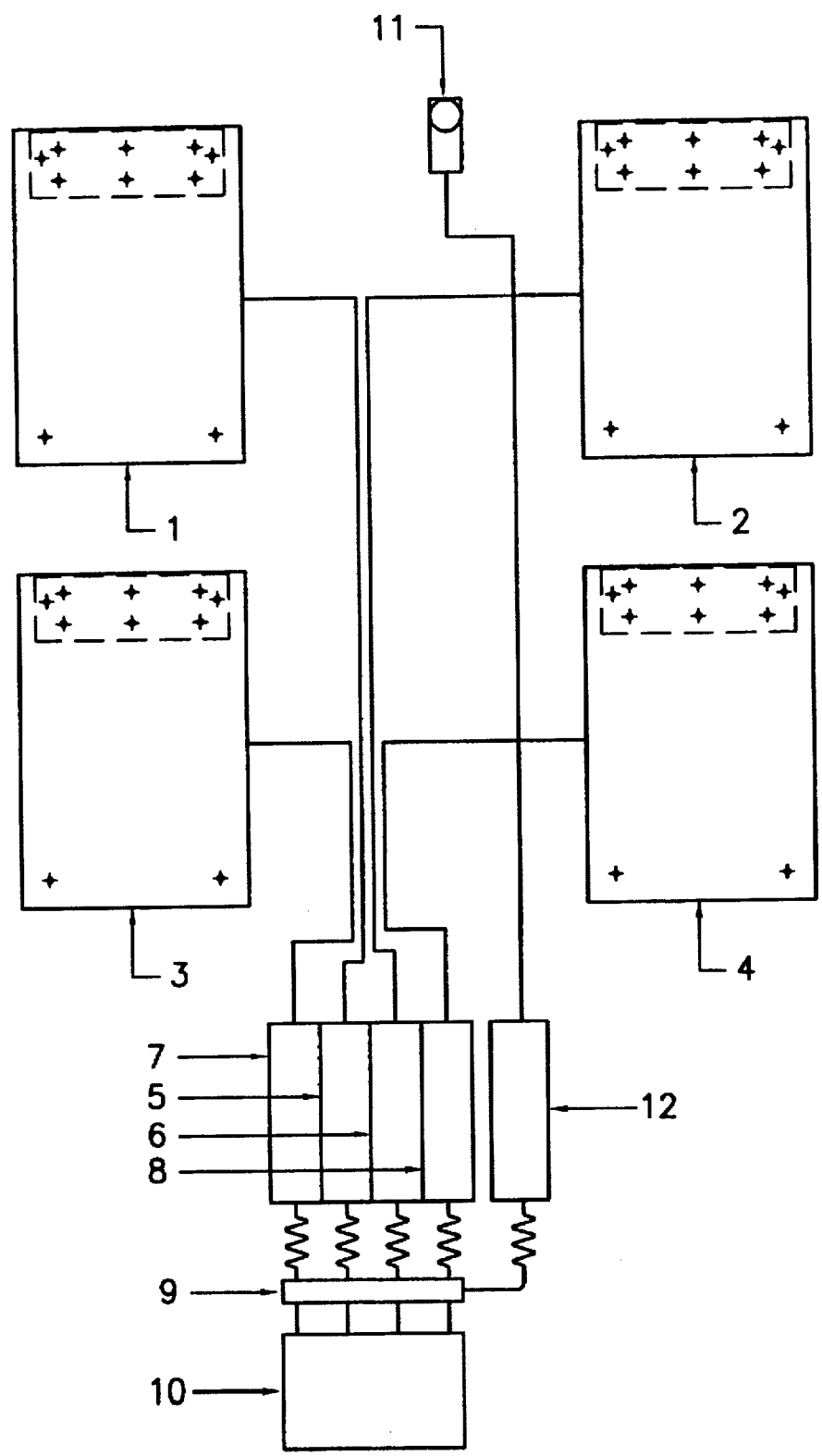

United States Patent [19]

Bull

[11] Patent Number: 5,708,215

[45] Date of Patent: Jan. 13, 1998

[54] APPARATUS AND METHOD FOR TESTING VEHICLES

[76] Inventor: Percy Frederick Bull, P. O. Box 28021, Christchurch, New Zealand

[21] Appl. No.: 633,370

[22] Filed: Apr. 16, 1996

[30] Foreign Application Priority Data

May 19, 1995 [NZ] New Zealand ............ 272165

[51] Int. Cl.$^6$ ........................................ G01M 15/00
[52] U.S. Cl. ........................ 73/862.29; 73/862.191
[58] Field of Search ................. 73/116, 862.29, 73/862.31, 862.192

[56] References Cited

U.S. PATENT DOCUMENTS

| | | | |
|---|---|---|---|
| 1,369,018 | 2/1921 | Fell | 73/862.29 |
| 2,211,108 | 8/1940 | Gerald | 73/862.29 |
| 2,362,308 | 11/1944 | Roberts | 73/862.29 |
| 2,623,385 | 12/1952 | Jamieson | 73/862.29 |
| 3,164,986 | 1/1965 | Krueger | 73/862.29 |
| 3,800,599 | 4/1974 | Goran | 73/116 |
| 3,903,738 | 9/1975 | Malchow | 73/862.29 |
| 4,691,560 | 9/1987 | Otto | 73/116 |

FOREIGN PATENT DOCUMENTS

| | | | |
|---|---|---|---|
| 0078227 | 6/1980 | Japan | 73/862.29 |
| 0116045 | 5/1918 | United Kingdom | 73/862.29 |

*Primary Examiner*—Robert Raevis

[57] ABSTRACT

The invention relates to the measurement of the torque generated by the motor of a vehicle. According to the invention, the conventional rolling dynamometer or shaft-driven dynamometer is replaced with a load measuring means such as a strain gauge which is arranged to measure the torque reaction transmitted through the body of a motor when it is operated under load. Where the motor being tested is installed in a vehicle, strain gauges or other measuring means may be arranged to support the weight of the vehicle and measure changes in its weight distribution under the influence of the torque reaction of the motor. The apparatus may include computer means for calculating the torque and power output of the motor from the data supplied by the load measuring means.

6 Claims, 4 Drawing Sheets

APPARATUS AND METHOD FOR TESTING VEHICLES

This invention relates to the determination of the motive force delivered by the motors of self-propelled vehicles. In this specification, the word "vehicle" includes aircraft as well as all machines capable of travelling on wheels or other ground-contacting means across land.

Measurements of the motive force delivered by the motors of vehicles are made in the course of designing and testing new vehicles, in repairing and servicing vehicles, and also, in some places, as part of regular compulsory tests of the airworthiness and roadworthiness of the vehicles. In the case of road vehicles such as motor cars and trucks, and propellor-driven aircraft, the measurements are usually made by means of dynamometers: devices in which the torque delivered by a rotating shaft or wheel of the vehicle or motor is measured by coupling the shaft or wheel to a rotating part of the dynamometer. The common form of dynamometer comprises a set of rollers which support and are frictionally driven by the road wheels of a motor-car; in other forms a shaft is coupled to, for example, the driven axle of a motor car or the propellor shaft of an aero-engine.

Legislation in the United States of America now requires the periodic testing of road-going vehicles for fuel consumption and emissions under a defined set of operating conditions. The apparatus prescribed for such tests includes a means for ascertaining the torque delivered by the driven road wheels of the vehicles and computer apparatus connected thereto for controlling the motors of the vehicles so as to deliver the torque required by the defined operating conditions. The proper operation of the computer apparatus requires that the operating characteristics of each individual model of vehicle be accommodated by the computer software.

Testing establishments in the United States of America have installed the required testing apparatus in the form of computer-controlled roller dynamometers, and many problems in their operation have become manifest. The most serious problems include measurement errors arising from wrong inflation of tires, worn and wrongly-sized tires, and the distortion of tires under the abnormally high pressures of contact with rollers instead of the road;

damage to tires arising from that abnormal contact with the rollers at high rotational speeds;

a number of serious accidents caused by vehicles' becoming dislodged from the rollers while their wheels are turning at high speeds; and as a result of the problems mentioned, serious delays in the testing of vehicles.

In the case of aircraft, the present technology requires that the engine of an aircraft be removed and installed into a dynamometer for testing. This procedure involves considerable expense and loss of use of the aircraft for a significant time.

The object of the present invention is to provide a method and means of testing the motive force delivered by the motor of a self-propelled vehicle which at least to some extent alleviates the problems which have been described.

The essence of the present invention is the measurement of the torque reaction transmitted through the body of a motor vehicle when the motor is under load, instead of the measurement, as in the prior art, of the torque output of the motor through its normal driving connections. In both the method and the apparatus of this invention, at least one load sensor such as a strain gauge measures change in the weight distribution of the vehicle is induced by torque reaction of the motor under load, and the torque reaction can be calculated from the change in the weight distribution.

According to this invention, a method of testing the motive force delivered by a vehicle motor comprises operating the motor under a load and measuring changes in the weight distribution of the vehicle as those changes are induced by torque reaction of the motor under load.

Further according to this invention, apparatus for testing the motive force delivered by a vehicle motor comprises load measuring means arranged and adapted to support the weight of the vehicle and to measure changes in the distribution of the weight of the vehicle which are induced by torque reaction of the motor, and means for preventing the vehicle from being propelled by the motor.

The said load-measuring means may comprise at least one strain gauge arranged and adapted to support the weight of the vehicle, and the strain gauge or gauges may be connected to a computer to supply measurement of load applied to the strain gauge or gauges as data input to the computer.

Where the vehicle is driven by ground-contacting means, for example the wheels of an ordinary motor car, at least the driving wheels or tracks of the vehicle may be lifted to prevent them from propelling the vehicle. Load may be applied to the engine by application of the vehicle's own brakes. Where the vehicle is an aircraft, wheels of the aircraft may be chocked to prevent the aircraft from being propelled by its motor, and the pitch of the propellor of a propellor-driven aircraft may be adjusted to provide a load for the engine.

Figure 2:
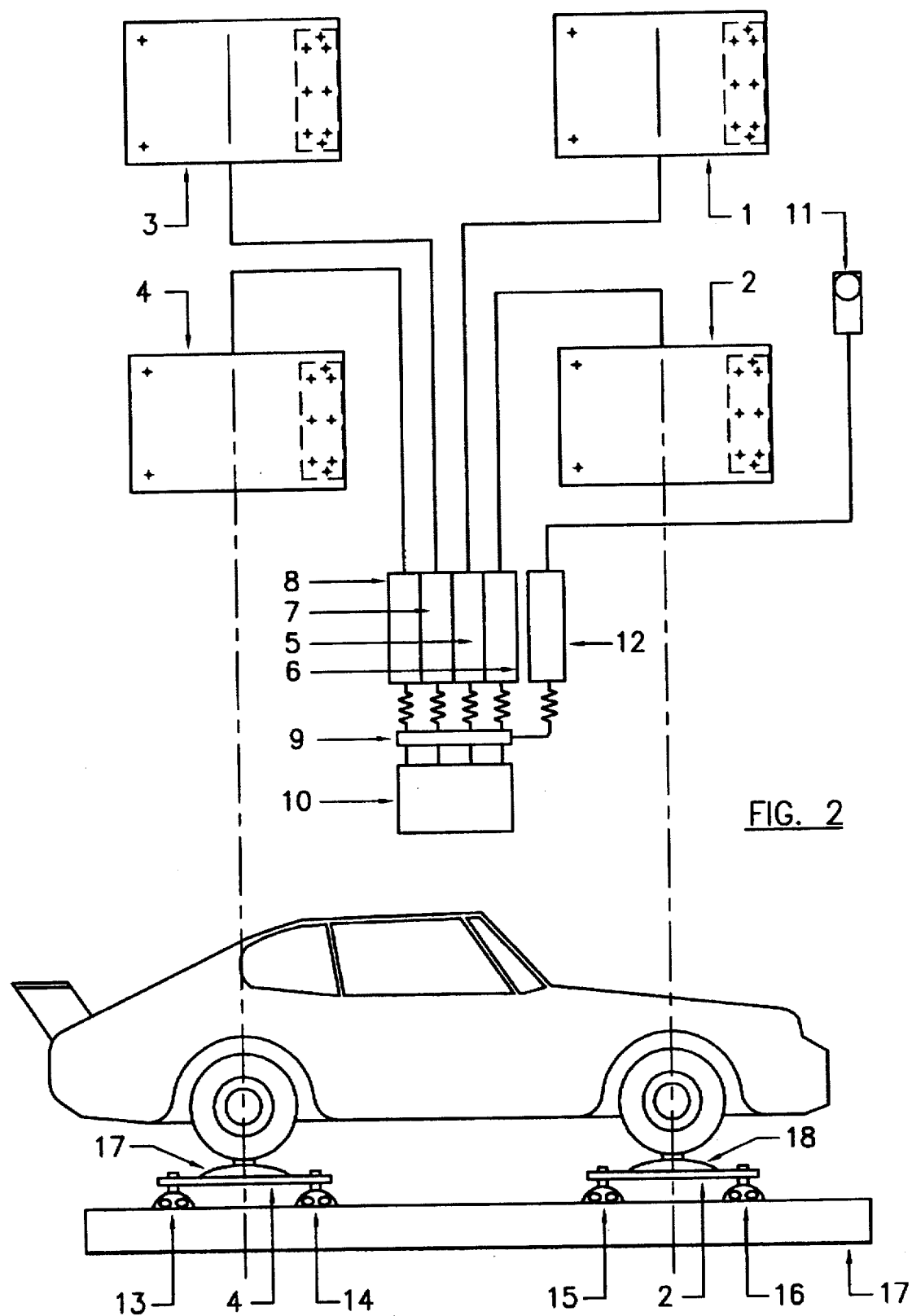
Figure 3:
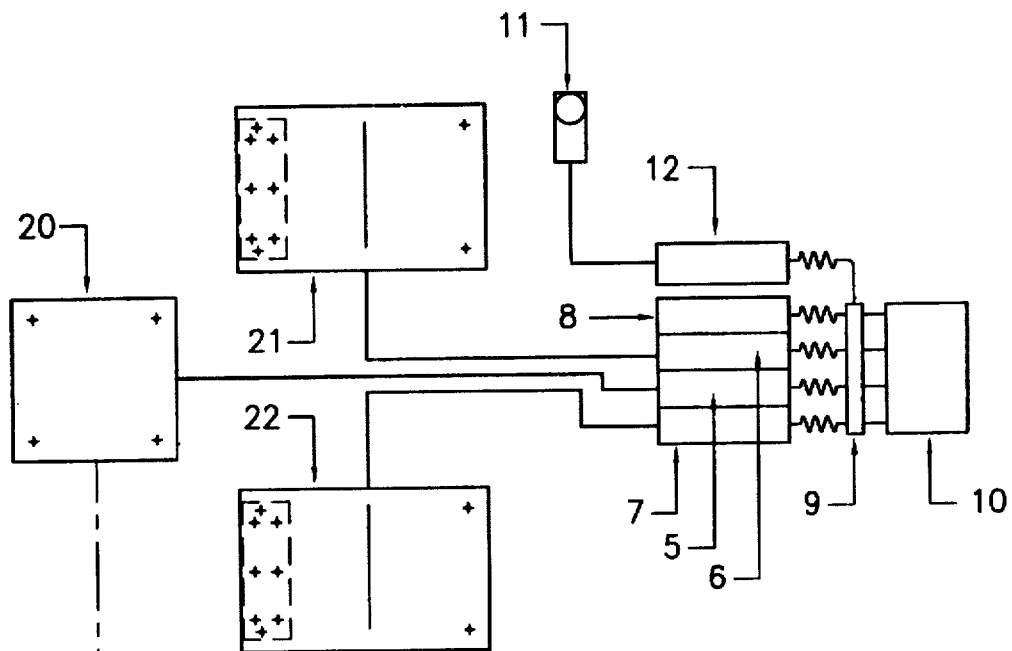
Figure 4:
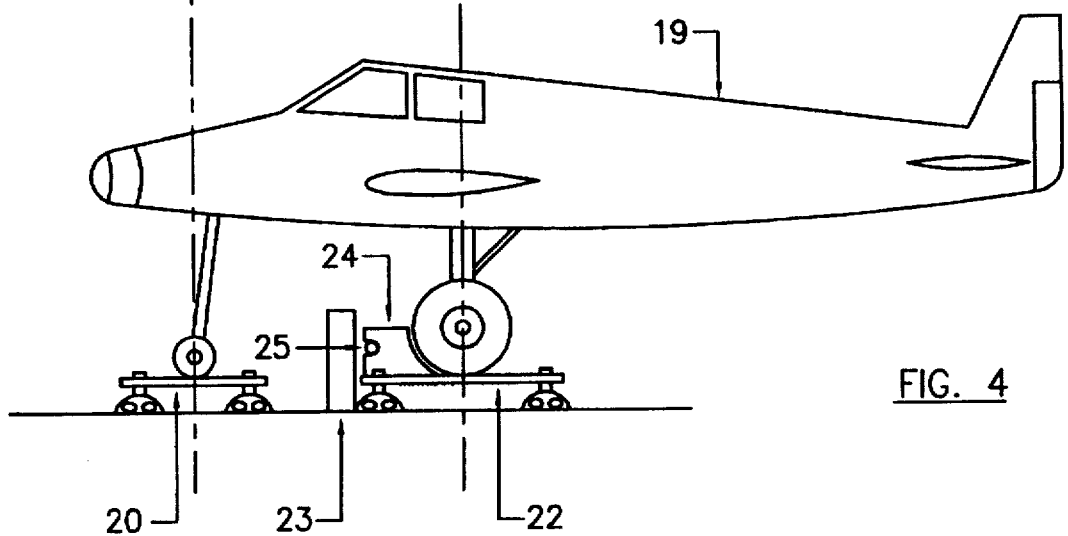
Figure 5:
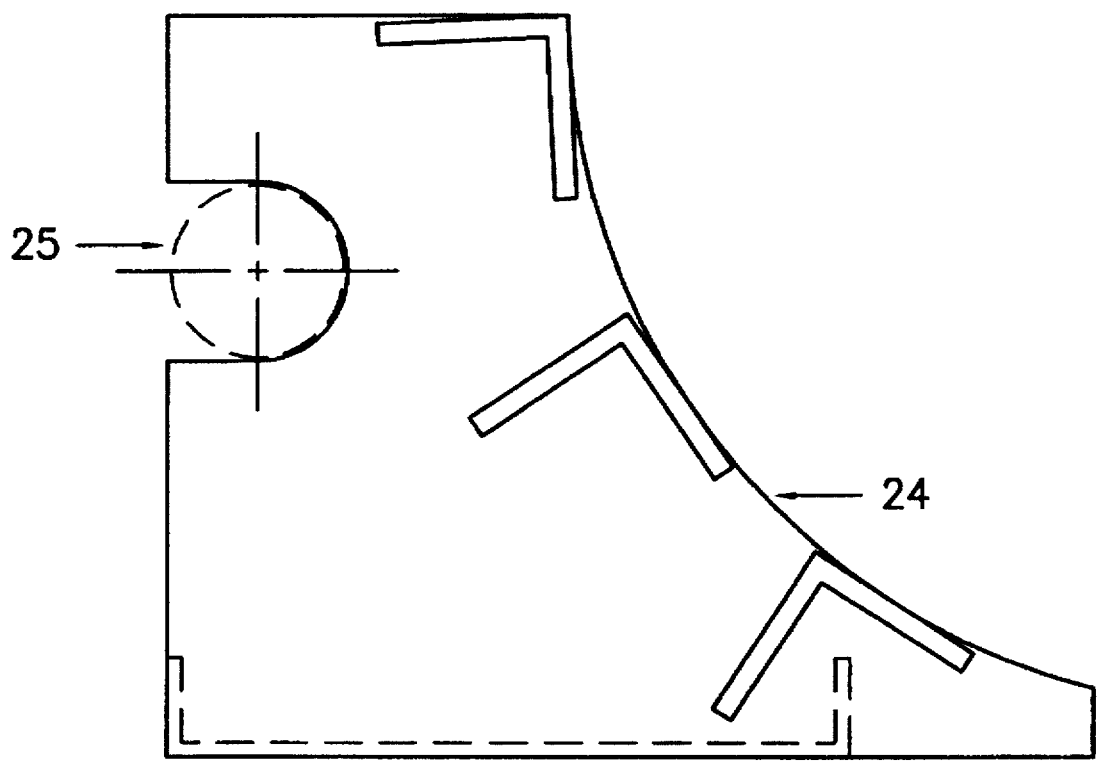

Embodiments of the invention will now be described by way of example only and without limitation of the generality of the invention as herein previously described, and with reference to the accompanying drawings wherein FIG. 1 is a schematic representation of an apparatus according to the invention, FIG. 2 is a combined schematic representation of the apparatus of FIG. 1 and a side elevation of a part of that apparatus as arranged to test the motor of an automobile, FIG. 3 is a schematic representation of a form of the apparatus of FIG. 1 which is adapted particularly to test an engine installed in an aircraft, FIG. 4 is a side elevation of a part of the apparatus of FIG. 3 as it is supporting an aircraft, and FIG. 5 is a detailed side elevation of a wheel chock of the apparatus of FIG. 4.

Referring to FIG. 1 of the accompanying drawings, a standard car-testing apparatus includes four load cells each comprising a base plate 1,2,3,4 supported by four strain gauges (see FIG. 2) connected through four amplifiers 5,6,7,8 and an analog-to-digital converter 9 to a computer 10. A pulse sensor 11 which detects the high-tension ignition pulses of the motor is connected to a tachometer 12 which is also connected to the analog-to-digital converter to provide the computer with information about the speed of the motor as it is tested. Each of the strain gauges in this embodiment of the invention can measure a strain of up to 500 kilograms, or 2000 kilograms for each of the load cells 1,2,3,4. Other ranges of measurement can be substituted as required.

FIG. 2 of the accompanying drawings shows the apparatus of FIG. 1 in use. The sixteen strain gauges, four 13,14,15,16 of which are shown in FIG. 2, rest on a suitable level ground surface or platform 17 and support the base plates two 2,4 of which are shown. Jack stands, two 17,18 of which are shown in FIG. 2, are firmly secured to the base plates 1,2,3,4 and they, in their turn, support a car 19 the motor of which which is to be tested. Chocks may be provided on the base plates 1,2,3,4 to provide additional safety measures.

When the apparatus is in use, the pulse sensor 11 is connected to the ignition system of the car, and the motor of the car is started and a low gear of the car's transmission is engaged. The car's accelerator is fully depressed and the motor speed rises accordingly. When the motor speed has risen to a value at which it is desired to be tested, the brakes of the car are applied to hold the motor at that speed despite the fully depressed accelerator. A typical computer can record 100 readings per second, and so it is only necessary to test the motor at any one speed for five to ten seconds. The motor is tested in this way at several increasing speeds according to the nature of the test being applied.

When the wheels are braked, reaction torque is transmitted from the body of the motor to the body of the car, and thence to the load cells, and the measurements of the loads applied to the individual base plates 1,2,3,4 are transmitted by the strain gauges to the computer 10. Together with the motor speed information supplied by the pulse sensor 11, this information enables the computer to calculate the torque being generated by the motor as a function of its speed. Look-up tables for each model of car may be provided to enable the computer to make these calculations as is presently the case with roller dynamometers. Additional sensors may be included to measure emissions and the fuel-air mixture, as required.

FIGS. 3 and 4 show a similar apparatus adapted to test the motor of an aircraft 19. In this case, only three base plates 20,21,22 of the standard apparatus are used, one 20 to support the nose wheel and the other two 21,22 to support the rear wheels of a tricycle undercarriage. The load cells supporting the rear wheels are prevented from moving by a solid barrier 23. The rear base plates 21,22 have bolted to them chocks one 24 of which is visible in FIG. 4 and shown in side elevation in FIG. 5. Each chock includes a roller mounted at 25 which allows the base plate to rise and fall while in contact with the barrier 23.

In standard periodic (for example 100 hours) checks of an aircraft motor, it is necessary to test the engine's power output and other characteristics such as fuel mixture (measured by a lambda sensor in the engine exhaust) and engine temperatures (measured by thermocouples). In this embodiment of the invention, the engine of the aircraft 19 is operated while the wheels of the aircraft are firmly braked as well as chocked. The engine is run at the speeds at which it is to be tested, using adjustment of the pitch of its propellor to adjust the load on the engine, while the apparatus measures and optionally provides a real-time read-out of the torque and power being delivered by the engine, and ancillary apparatus as desired measures the other characteristic of the engine.

What I claim is:

1. A method of testing the motive force delivered by a vehicle motor comprising operating the motor under load and measuring changes in the weight distribution of the vehicle as those changes are induced by torque reaction of the motor.

2. Apparatus for testing the motive force delivered by a vehicle motor comprising load-measuring means arranged and adapted to support the weight of the vehicle and to measure changes in the distribution of the weight of the vehicle which are induced by torque reaction of the motor under load, and means for preventing the vehicle from being propelled by the motor.

3. Apparatus according to claim 2, wherein the said load-measuring means comprises at least one strain gauge.

4. Apparatus according to claim 3, wherein the strain gauge is connected to a computer to supply measurement of load applied to the strain gauge or gauges as data input to the computer.

5. Apparatus according to claim 2, wherein the said means for preventing the vehicle from being propelled by the motor comprises at least one support arranged and adapted to support driving wheels or tracks of the vehicle in a raised position relative to the ground.

6. Apparatus according to claim 2 which includes computer means for calculating the torque and power output of the motor from data output thereto by the load measuring means.

* * * * *